United States Patent
Sefidvash

(10) Patent No.: US 7,656,893 B2
(45) Date of Patent: Feb. 2, 2010

(54) SYSTEM AND METHOD FOR IMPLEMENTING AUTO-CONFIGURABLE DEFAULT POLARITY

(75) Inventor: Khorvash Sefidvash, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 1005 days.

(21) Appl. No.: 10/372,158

(22) Filed: Feb. 21, 2003

(65) Prior Publication Data

US 2004/0037119 A1    Feb. 26, 2004

Related U.S. Application Data

(60) Provisional application No. 60/402,096, filed on Aug. 7, 2002.

(51) Int. Cl.
*H04L 12/66* (2006.01)
(52) U.S. Cl. ............................................. 370/463
(58) Field of Classification Search ............. 370/464, 370/537; 326/38
See application file for complete search history.

(56) References Cited

U.S. PATENT DOCUMENTS

| | | | |
|---|---|---|---|
| 4,717,912 A * | 1/1988 | Harvey et al. ............ 326/46 |
| 5,214,654 A * | 5/1993 | Oosawa .................... 714/718 |
| 5,386,155 A * | 1/1995 | Steele et al. ............... 326/37 |
| 5,635,856 A * | 6/1997 | Raza et al. ................. 326/38 |
| 5,684,343 A * | 11/1997 | Riley ......................... 307/127 |
| 6,049,837 A | 4/2000 | Youngman |
| 6,072,783 A * | 6/2000 | Riley ......................... 370/294 |
| 6,215,816 B1 * | 4/2001 | Gillespie et al. ........... 375/219 |
| 6,606,670 B1 * | 8/2003 | Stoneking et al. ......... 710/14 |
| 6,633,287 B1 * | 10/2003 | Yatabe et al. ............... 345/211 |
| 6,944,163 B2 * | 9/2005 | Bottorff et al. ............ 370/395.5 |

* cited by examiner

*Primary Examiner*—Jayanti K Patel
*Assistant Examiner*—Anthony Sol
(74) *Attorney, Agent, or Firm*—McAndrews, Held & Malloy, Ltd.

(57) ABSTRACT

The present invention relates to a system and method for implementing auto-configurable default polarity. More specifically, the present invention relates to a transceiver module comprising, for example, a single chip multi-sublayer PHY, where the single chip multi-sublayer PHY is adapted to implement auto-configurable default polarity. In one embodiment, the transceiver module comprises at least one program module adapted to be programmed with at least a default polarity setting. The single-chip multi-sublayer PHY comprises at least one selection register communicating with at least the program module, where the selection register is adapted to store at least the default polarity setting. The single chip multi-sublayer PHY further comprises at least one multiplexer communicating with at least the selection register and adapted to select one polarity from at least two possible polarities based at least in part on the default polarity setting.

16 Claims, 3 Drawing Sheets

SYSTEM AND METHOD FOR IMPLEMENTING AUTO-CONFIGURABLE DEFAULT POLARITY

CROSS-REFERENCE TO RELATED APPLICATIONS/INCORPORATION BY REFERENCE

This application is related to, and claims benefit of and priority from, Provisional Application No. 60/402,096 dated Aug. 7, 2002, titled "System and Method For Implementing Auto-Configurable Default Polarity", the complete subject matter of which is incorporated herein by reference in its entirety.

U.S. Pat. No. 6,424,194, U.S. application Ser. No. 09/540,243 filed on Mar. 31, 2000, U.S. Pat. No. 6,389,092, U.S. Pat. No. 6,340,899, U.S. application Ser. No. 09/919,636 filed on Jul. 31, 2001, U.S. application Ser. No. 09/860,284 filed on May 18, 2001, U.S. application Ser. No. 10/028,806 filed on Oct. 25, 2001, U.S. application Ser. No. 09/969,837 filed on Oct. 1, 2001, U.S. application Ser. No. 10/159,788 entitled "Phase Adjustment in High Speed CDR Using Current DAC" filed on May 30, 2002, U.S. application Ser. No. 10/179,735 entitled "Universal Single-Ended Parallel Bus; fka, Universal 1.8V Power Supply in 0.13 MM CMOS" filed on Jun. 21, 2002, and U.S. Application Ser. No. 60/402,097 entitled "System And Method For Implementing A Single Chip Having A Multiple Sub-Layer Phy" filed on Aug. 7, 2002 and U.S. application Ser. No. 10/282,933 entitled "System And Method For Implementing A Single Chip Having A Multiple Sub-Layer Phy" filed on Oct. 29, 2002 are each incorporated herein by reference in their entirety.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Embodiments of the present invention relate generally to a method and system for implementing polarity for a single chip.

High-speed digital communication networks over copper and optical fiber are used in many network communication and digital storage applications. Ethernet and Fiber Channels are two widely used communication protocols that continue to evolve in response to the increasing need for higher bandwidth in digital communication systems.

The Open Systems Interconnection (alternatively referred to as the "OSI") model (ISO standard) was developed to establish standardization for linking heterogeneous computer and communication systems. The OSI model includes seven distinct functional layers including Layer 7: an application layer; Layer 6: a presentation layer; Layer 5: a session layer; Layer 4: a transport layer; Layer 3: a network layer; Layer 2: a data link layer; and Layer 1: a physical layer. Each OSI layer is responsible for establishing what is to be done at that layer of the network but not how to implement it. Layers 1 to 4 handle network control, and data transmission and reception. Layers 5 to 7 handle application issues. It is contemplated that specific functions of each layer may vary to a certain extent, depending on the exact requirements of a given protocol to be implemented for that layer. For example, the Ethernet protocol provides collision detection and carrier sensing in the physical layer.

The physical layer (i.e., Layer 1) is responsible for handling all electrical, optical, and mechanical requirements for interfacing to the communication media. The physical layer provides encoding and decoding, synchronization, clock data recovery, and transmission and reception of bit streams. Typically, high-speed electrical or optical transceivers are the hardware elements used to implement such layer.

As data rate and bandwidth requirements increase, 10 Gigabit data transmission rates are being developed and implemented in high-speed networks. Pressure exists to develop a 10 Gigabit physical layer for high-speed serial applications. Transceivers for 10 G applications are needed for the 10 G physical layer. The specification IEEE P802.3ae draft 5 describes the physical layer requirements for 10 Gigabit applications and is incorporated herein by reference in its entirety.

An optical-based transceiver, for example, includes various functional components such as clock data recovery, clock multiplication, serialization/deserialization, encoding/decoding, electrical/optical conversion, descrambling, media access control, controlling, and data storage. Many of the functional components are often implemented in separate IC chips.

It is currently known that transceivers may have a different polarity from the devices or upper level systems with which they are associated (alternatively referred to as "associated devices"). Such different polarities must be accommodated. Some solutions have included inserting one or more chips between the transceiver and the associated devices (or software) to re-configure the polarity. It is contemplated that inserting such a chip may affect production cost and time. Furthermore, such chips may not work correctly, adversely affecting the communication between the transceiver and the associated devices.

Another solution involves making at least two versions of the transceiver, a first version having one polarity, and a second version having the opposite polarity. It is contemplated that this solution is susceptible to error, in that the wrong version of the transceiver may be used, adversely affecting communication between the transceiver and the associated devices.

A further solution involves the crossing of signal paths to achieve correct polarity. This solution, however, results in signal degradation.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the present invention address one or more of the problems outlined above. One embodiment of the present invention relates to a system and method for implementing auto-configurable default polarity.

One embodiment relates to a single chip multi-sublayer PHY system. In this embodiment, the single chip multi-sublayer PHY comprises at least one selection register adapted to store at least one default polarity setting and at least one selection module communicating with at least the selection register and adapted to select one polarity from at least two possible polarities based at least in part on the default polarity setting.

In another embodiment, the selection module of the single chip multi-sublayer PHY comprises at least one multiplexer. This embodiment may further comprise an inverter coupled to at least the selection module. At least one differential driver may be coupled to the selection device having at least one output interface coupled thereto. This embodiment may further comprise a polarity override interface communicating with the selection register and adapted to communicate an override signal thereto. Additionally, the embodiment may comprise at least one program module or EEPROM coupled to the selection register.

Another embodiment of the present invention comprises a transceiver. In this embodiment the transceiver comprises at least one program module adapted to be programmed with at least a default polarity setting and a single chip multi-sublayer PHY. Further, the single chip multi-sublayer PHY comprises at least one selection register communicating with at least the program module and at least one selection module communicating with at least the selection register. In this embodiment, the selection register is adapted to store at least the default polarity setting, while the selection module is adapted to select one polarity from at least two possible polarities based at least in part on the default polarity setting.

Yet another embodiment of the present invention relates to a method of configuring a polarity for a transceiver module. The embodiment comprises writing a default polarity into at least one programming module, writing or storing the default polarity into at least one selection register on a single chip multi-sublayer PHY and selecting the polarity from at least two possible polarities using at least the default polarity. This embodiment may also comprise overriding the default polarity and selecting the polarity from at least two possible polarities using at least the overridden default polarity These and other advantages, aspects and novel features of the present invention, as well as details of an illustrated embodiment thereof, will be more fully understood from the following description and drawings.

DETAILED DESCRIPTION OF THE INVENTION

Figure 1:
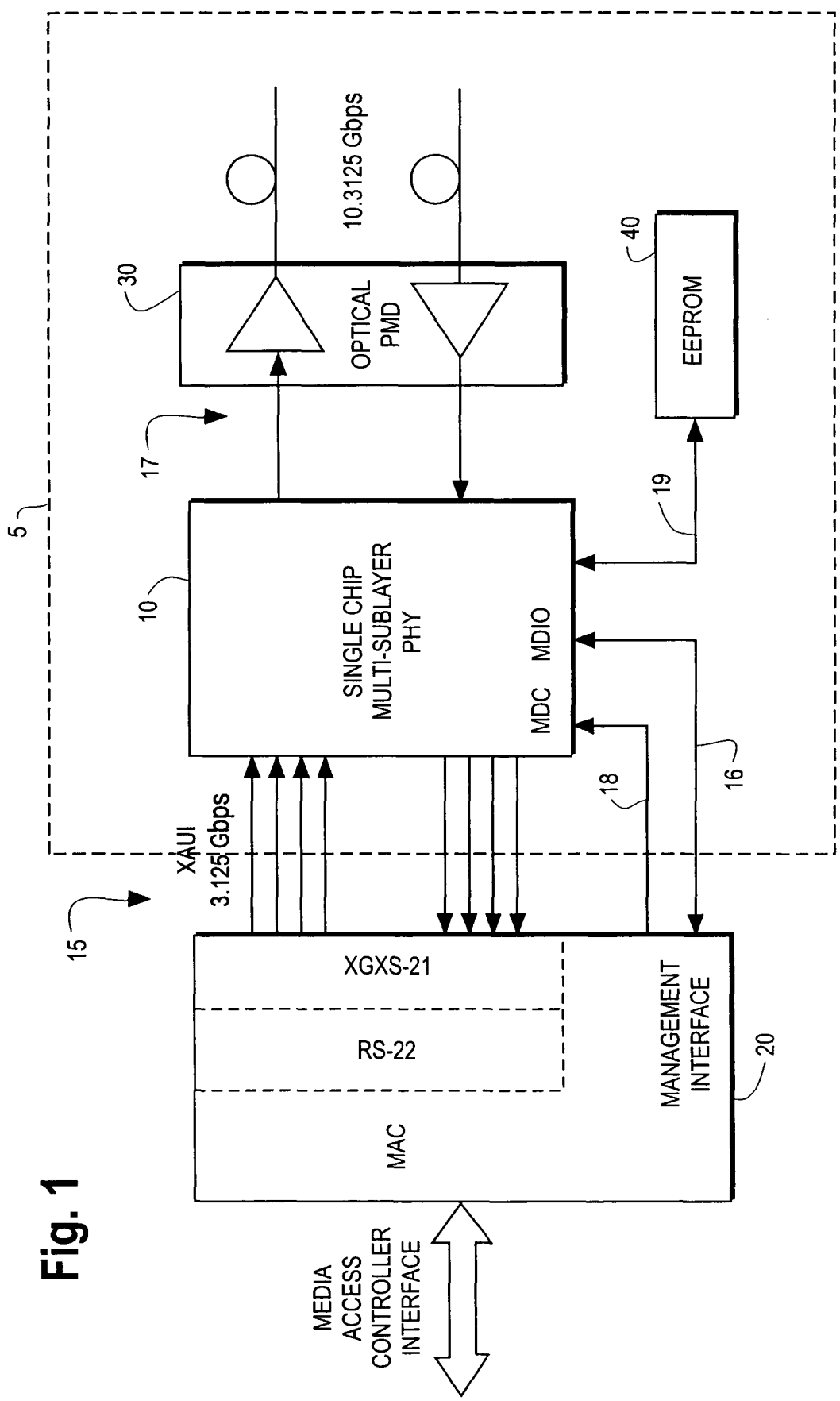
FIG. 1 illustrates a block diagram of a transceiver system in accordance with one embodiment of the present invention.

FIG. 1 illustrates a schematic block diagram illustrating certain components of a Gigabit transceiver module, generally designated 5, with a XAUI interface 15 in accordance with an embodiment of the present invention. The transceiver module 5 may, in one embodiment of the present invention, be compatible with the XENPAK optical module standard. The transceiver module 5 includes, for example, a single-chip multi-sublayer PHY 10, an optical PMD 30, and an EEPROM 40.

According to an embodiment of the present invention, a media access controller (alternatively referred to as "MAC") 20 interfaces to the single-chip multi-sublayer PHY 10 through the XAUI transmit and receive interface 15. In general, the MAC layer comprises one of two sublayers of the data link control layer and is concerned with sharing the physical connection to a network among several upper-level systems. In this embodiment, the single-chip multi-sublayer PHY 10 interfaces to the optical PMD 30 through a PMD transmit and receive interface 17. The MAC 20 also interfaces to the single-chip multi-sublayer PHY 10 through the serial management data input/output (alternatively referred to as an "MDIO") interface 16. The single-chip multi-sublayer PHY 10 also interfaces to EEPROM 40 through a two-wire serial interface 19. In this embodiment, a XGMII interface is not used.

The XAUI interface 15 comprises 4 channels of 3 Gigabit serial data received by the single-chip multi-sublayer PHY 10 from the MAC 20 and 4 channels of 3 Gigabit serial data transmitted from the single-chip multi-sublayer PHY 10 to the MAC 20. In an embodiment of the present invention, the MAC 20 includes a XGXS sublayer interface 21 and a reconciliation sublayer or RS interface 22. In one embodiment of the present invention, for Ethernet operation for example, the 3 Gigabit data rate is actually 3.125 Gbps and for Fibre Channel operation for example, the 3 Gigabit data rate is actually 3.1875 Gbps.

The PMD interface 17 comprises a 10 Gigabit serial transmit differential interface and a 10 Gigabit serial receive differential interface between the single-chip multi-sublayer PHY 10 and the optical PMD 30 in accordance with an embodiment of the present invention. In one embodiment of the present invention, for Ethernet operation for example, the 10 Gigabit data rate is actually 10.3125 Gbps and for Fibre Channel operation for example, the 10 Gigabit data rate is actually 10.516 Gbps.

Figure 2:
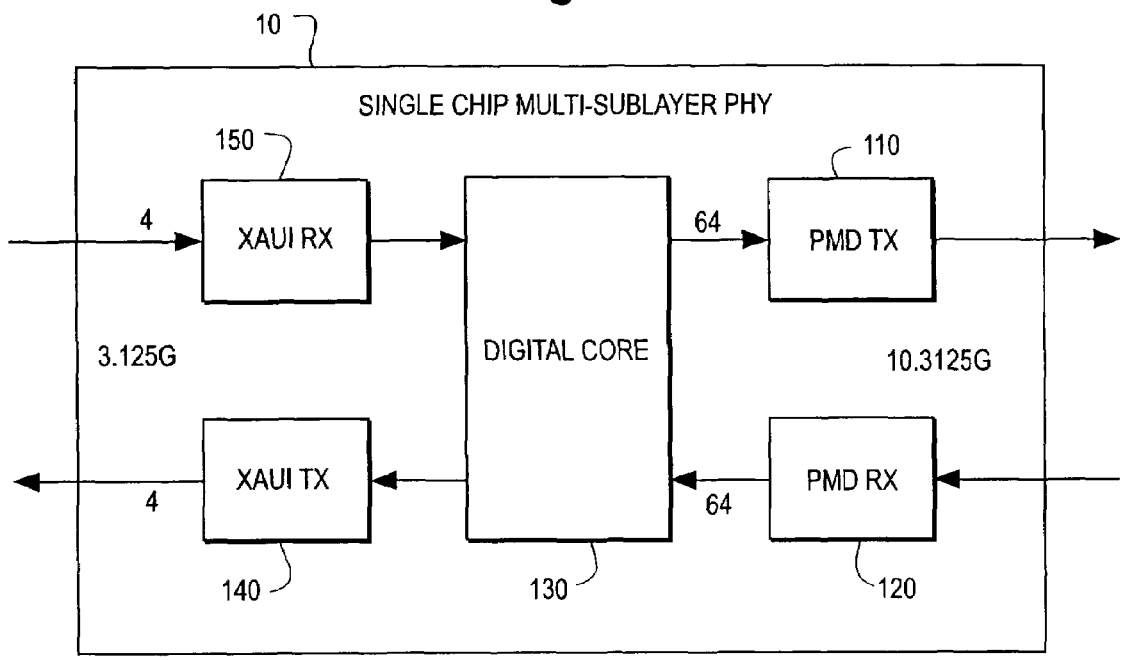
FIG. 2 illustrates a block diagram of a single chip multi-sublayer PHY device in accordance with one embodiment of the present invention.

FIG. 2 illustrates a schematic block diagram of the single-chip multi-sublayer PHY 10 used in the transceiver module 5 of FIG. 1 in accordance with an embodiment of the present invention. The single-chip multi-sublayer PHY 10 comprises a PMD transmit (alternatively referred to as "TX") module 110, a PMD receive (alternatively referred to as "RX") module 120, a digital core module 130, a XAUI transmit or TX section 140, and a XAUI receive or RX module 150.

One exemplary embodiment of the present invention relates to a system and method for implementing auto-configurable default polarity. In this embodiment, a transceiver module (similar to those provided above, for example) includes a single chip multi-sublayer PHY adapted to implement auto-configurable default polarity.

Figure 3:
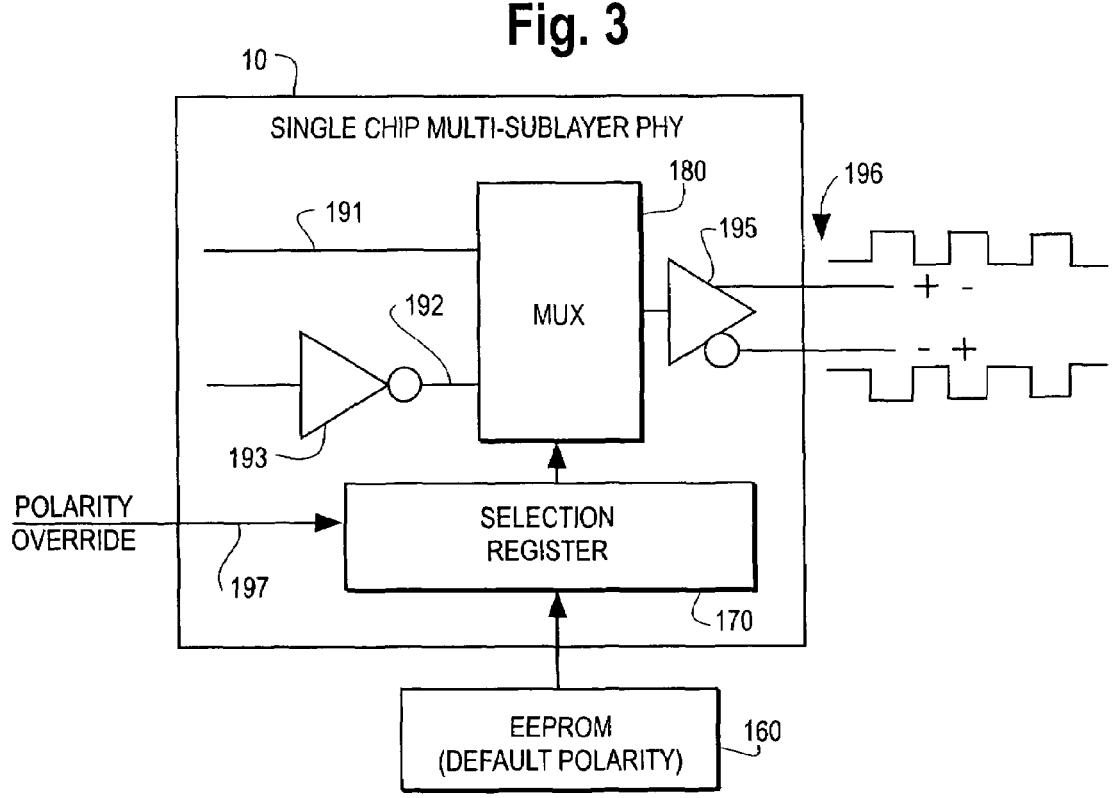
FIG. 3 illustrates a block diagram of a single chip multi-sublayer PHY device similar to that of FIG. 2 including a selection register and multiplexer in accordance with one embodiment of the present invention.

FIG. 3 illustrates one embodiment of the present invention comprising at least one program module adapted to be programmed with at least a default polarity setting. More specifically, the program module may comprise an EEPROM 160 that is adapted to be programmed with one or more default polarity settings. While an EEPROM is discussed, other program modules are contemplated. Moreover, it is contemplated that the EEPROM may be on the single chip multi-sublayer PHY or otherwise on the transceiver module, or outside the transceiver module but in the upper level system. It may be desirable to program the EEPROM in a given transceiver module such that the programmed polarity is compatible with the particular customer that will use the given transceiver module.

In the illustrated embodiment, the program module communicates with at least one selection register 170, where the selection register is adapted to store at least the default polarity setting. In this embodiment, the default polarity setting is programmed or written into the EEPROM 160. Upon start-up, such default polarity setting is communicated to the selection register 170.

One embodiment of the single chip multi-sublayer PHY further comprises at least one selection module or device 180 (for example, a multiplexer or mux) communicating with at least the selection register 170 and adapted to select at least one polarity from at least two possible polarities based at least in part on the default polarity setting. In this embodiment, at least two signals 191 and 192 having different polarities (for example a first signal having a first polarity and a second signal having a second polarity) are communicated to the mux 180. As an example, if the default polarity corresponds to the polarity determined at the output by signal 191, then signal 191 is selected by the mux 180. Alternatively, if the default polarity corresponds to the polarity determined at the output by signal 192, then signal 192 is selected by the mux 180.

In this embodiment, an inverter 193 is shown coupled to the mux 180, such that the second polarity is the inverse or opposite of the first polarity, although other relationships between the two signals and their respective polarities is contemplated. Further a differential driver 195 is illustrated communicating with the mux 180 and an output interface 196 (a differential twisted pair for example).

It is contemplated that, in one embodiment, it may be desirable to change the default polarity setting stored in the selection register. FIG. 3 further illustrates a polarity override interface 197 coupled to and communicating with the selection register 170. In one embodiment, the polarity interface enables overriding of the default polarity setting stored in the selection register, such that a different polarity may be used. It is also contemplated that, in one embodiment, a different polarity setting may be programmed into the program module or EEPROM 160 and communicated to the selection register 170.

Figure 4:
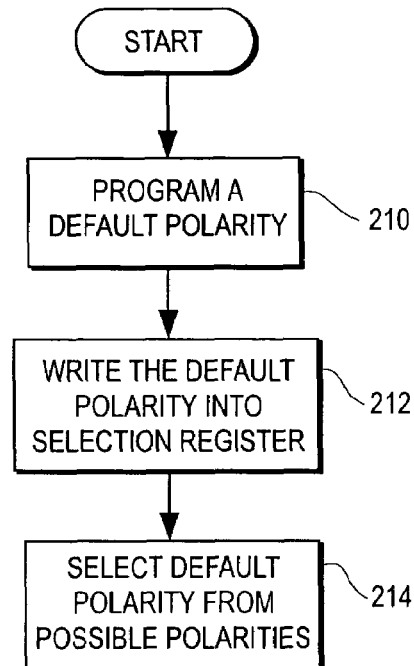
FIG. 4 illustrates a high level flow diagram of a method for auto-configuring a polarity using, for example, a single chip multi-sublayer PHY in accordance with one embodiment of the present invention.

FIG. 4 illustrates a high level flow diagram illustrating one embodiment of the present invention relating to a method, generally designated 200, for auto-configuring a polarity (for a transceiver module for example) using a single chip multi-sublayer PHY, for example. This embodiment comprises programming a default polarity using at least one programming module and writing the default polarity into at least one selection register on the single chip multi-sublayer PHY as illustrated by blocks 210 and 212 respectively. The single chip multi-sublayer PHY selects the polarity from at least two possible polarities using at least the default polarity as illustrated by block 214. For example, if at the output, the default polarity corresponds to the first signal (signal 191 for example) the mux selects the first signal. If at the output, the default polarity corresponds to a second signal (signal 192 for example) the mux selects the second signal.

Figure 5:
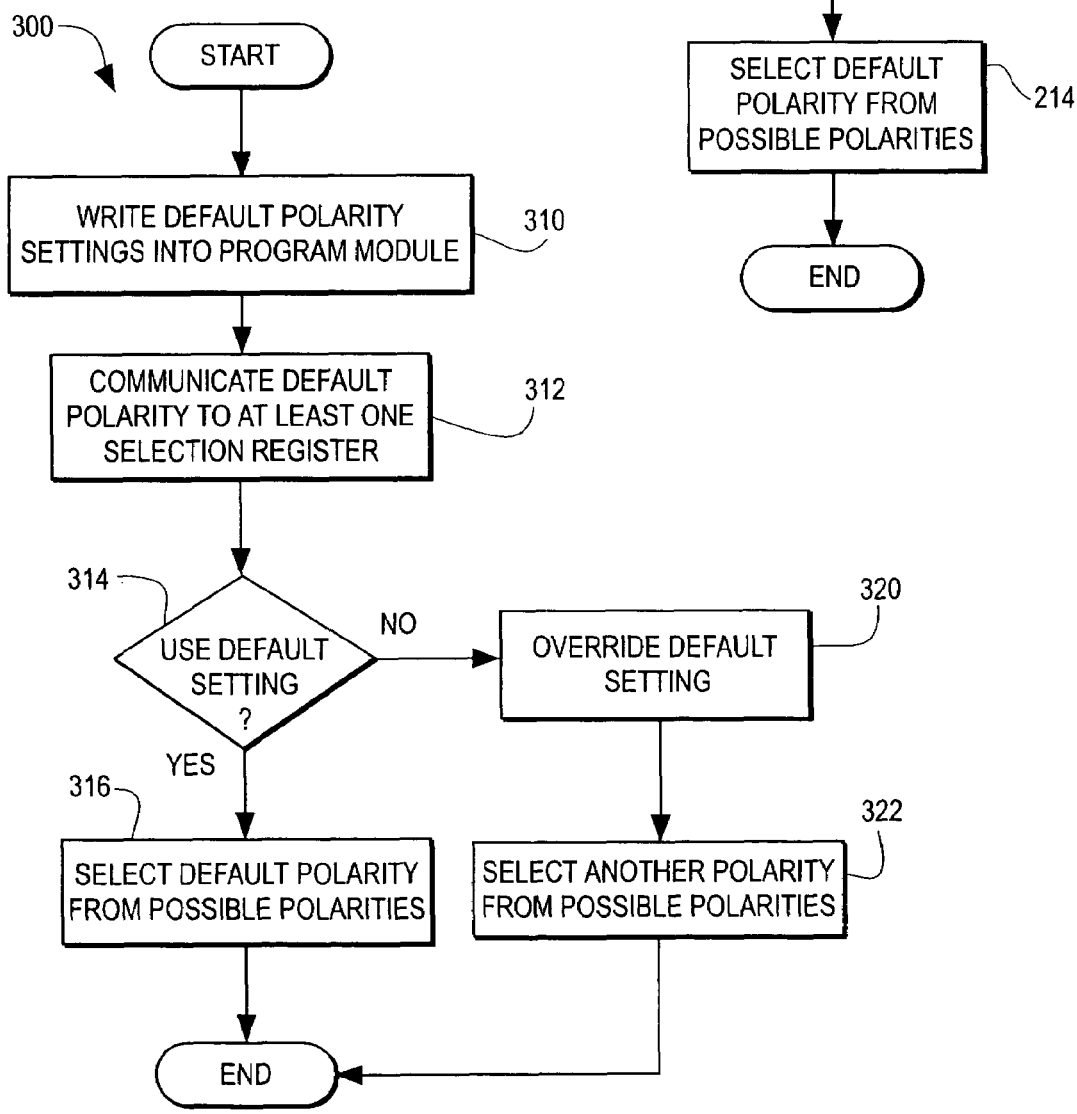
FIG. 5 illustrates a detailed flow diagram of a method for auto-configuring a polarity using, for example, a single chip multi-sublayer PHY in accordance with one embodiment of the present invention.

FIG. 5 illustrates a detailed flow diagram of a method, generally designated 300, for auto-configuring a polarity using, for example, a single chip multi-sublayer PHY in accordance with one embodiment of the present invention. This embodiment comprises writing one or more default polarity settings into the program module as illustrated by block 310. In one embodiment, the default polarity setting is programmed or written into the program module or EEPROM. Upon start-up, such default polarity setting is communicated to at least one selection register as illustrated by block 312, where the selection register is adapted to store at least the default polarity setting.

In the illustrated embodiment, method 300 determines whether the default polarity settings are used by an associated device as illustrated by diamond 314. In other words, for example, a user (e.g., a customer desiring to couple the transceiver module of the present invention to an associated device) determines whether the associated device has a polarity that corresponds to the default polarity. If the default polarity settings are used by the associated device, the selection device or module (e.g., the mux) communicating with at least the selection register, selects the polarity (corresponding to the default polarity for example) from at least two possible polarities as illustrated by block 316. In this embodiment, the selection device or module selects the one polarity based at least in part on the default polarity setting.

However, if the default polarity settings is used by the associated device, the default polarity is overridden such that a different polarity setting may be communicated and stored in the at least one selection register as illustrated by block 320. In other words, for example, the user may modify the default polarity so that it corresponds to the polarity of the associated device. In this embodiment, the polarity override coupled to and communicating with the selection register is used to override the default setting. The selection device or module (e.g., the mux) communicating with at least the selection register, selects another polarity from the possible polarities as illustrated by block 322.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A transceiver comprising:
   at least one program module adapted to be programmed with a default polarity setting, wherein said default polarity setting is communicated upon power up; and
   a PHY comprising:
   at least one selection register communicating with at least said program module, said selection register adapted to store said default polarity setting; and
   at least one selection module communicating with said at least one selection register and adapted to select at least one polarity from at least two possible polarities based at least in part on said default polarity setting.

2. The transceiver of claim 1, comprising at least one optical PMD communicating with said PHY.

3. The transceiver of claim 2, comprising at least one PMD transmit and receive interface coupled to said optical PMD and said PHY.

4. The transceiver of claim 3, wherein said PMD transmit and receive interface comprises a 10 Gigabit serial transmit differential interface and a 10 Gigabit serial receive differential interface.

5. The transreceiver of claim 1, wherein said at least one selection module comprises a multiplexer.

6. The transceiver of claim 1 comprising an inverter coupled to at least said selection module.

7. The transceiver of claim 1 comprising a differential driver coupled to said selection module.

8. The transceiver of claim 7 comprising at least one output interface coupled to at least said differential driver.

9. The transceiver of claim 1 comprising a polarity override interface communicating with said selection register and adapted to communicate an override signal thereto.

10. A system comprising:
a PHY, said PHY comprising:
at least one selection register adapted to store at least default polarity setting from at least one program module that is external to the PHY; and
at least one selection module communicating with said at least one selection register and adapted to select at least one polarity from at least two possible polarities based at least in part on said default polarity setting.

11. The system of claim 10, wherein said selection module comprises at least one multiplexer.

12. The system of claim 10 comprising an inverter coupled to at least said selection module.

13. The system of claim 10 comprising a differential driver coupled to said selection module.

14. The system of claim 13 comprising at least one output interface coupled to at least said differential driver.

15. The system of claim 10 comprising a polarity override interface communicating with said selection register and adapted to communicate an override signal thereto.

16. The system of claim 10, further comprising at least one program module coupled to said selection register.

* * * * *

UNITED STATES PATENT AND TRADEMARK OFFICE
CERTIFICATE OF CORRECTION

PATENT NO. : 7,656,893 B2  Page 1 of 1
APPLICATION NO. : 10/372158
DATED : February 2, 2010
INVENTOR(S) : Khorvash Sefidvash It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1456 days.

Signed and Sealed this

Thirtieth Day of November, 2010

David J. Kappos
*Director of the United States Patent and Trademark Office*